(12) United States Patent
Asao

(10) Patent No.: US 7,365,813 B2
(45) Date of Patent: Apr. 29, 2008

(54) COLOR LIQUID CRYSTAL DISPLAY DEVICE

(75) Inventor: Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/553,035

(22) PCT Filed: Apr. 27, 2005

(86) PCT No.: PCT/JP2005/008453

§ 371 (c)(1),
(2), (4) Date: Sep. 22, 2006

(87) PCT Pub. No.: WO2005/106574

PCT Pub. Date: Nov. 10, 2005

(65) Prior Publication Data

US 2007/0080912 A1    Apr. 12, 2007

(30) Foreign Application Priority Data

Apr. 28, 2004  (JP)  ............... 2004-132599
Apr. 13, 2005  (JP)  ............... 2005-115943

(51) Int. Cl.
*G02F 1/1335*   (2006.01)
*G09G 3/36*   (2006.01)

(52) U.S. Cl. .................. 349/96; 349/97; 349/113; 345/88

(58) Field of Classification Search ............ 345/113, 345/115, 116, 172, 174, 95, 37, 96, 97, 129, 345/88; 349/113, 115, 116, 172, 174, 95, 349/37, 96, 97, 129

See application file for complete search history.

(56) References Cited

U.S. PATENT DOCUMENTS 5,750,214 A   5/1998   Ito et al. .................. 428/1

(Continued)

FOREIGN PATENT DOCUMENTS

EP   0 978 753 A   2/2000   ............... 345/87 X (Continued)

OTHER PUBLICATIONS

Assouline G. Hareng, et al., "Liquid-Crystal Display with Electrically Controlled Birefringence", Electronics Letters, vol. 8, No. 2, Jan. 27, 1972, pp. 45 and 46.

*Primary Examiner*—Brian M Healy
(74) *Attorney, Agent, or Firm*—Fitzpatrick, Cella, Harper & Scinto

(57) ABSTRACT

A liquid crystal display apparatus includes at least one polarization plate, a phase difference plate, a pair of oppositely disposed substrates at least one of which is a transparent substrate, a liquid crystal disposed between said pair of substrates, and means for applying a voltage to said liquid crystal so that a retardation of said liquid crystal is modulated depending on the voltage applied to said liquid crystal. The liquid crystal is placed in a first alignment state which is determined by said pair of substrates when the voltage is not applied thereto. The phase difference plate has a retardation so that light passing through said liquid crystal, said phase difference plate, and said polarization plate assumes chromatic color when the voltage is not applied to said liquid crystal. The liquid crystal is placed in a second alignment state in which said liquid crystal is aligned obliquely compared with the first alignment state so that the retardation of said liquid crystal cancels the retardation of said phase difference plate when the voltage is applied to said liquid crystal.

15 Claims, 6 Drawing Sheets

U.S. PATENT DOCUMENTS

| | | | |
|---|---|---|---|
| 5,753,937 A | 5/1998 | Shimomaki et al. | 257/59 |
| 5,858,273 A | 1/1999 | Asaoka et al. | 242/299.4 |
| 5,932,136 A | 8/1999 | Terada et al. | 252/299.01 |
| 6,014,195 A | 1/2000 | Sakamoto et al. | 349/96 |
| 6,083,574 A | 7/2000 | Asao et al. | 428/1.1 |
| 6,122,031 A | 9/2000 | Terada et al. | 349/155 |
| 6,128,064 A | 10/2000 | Moriyama et al. | 349/172 |
| 6,139,927 A | 10/2000 | Takao et al. | 428/1.26 |
| 6,163,360 A * | 12/2000 | Tanaka et al. | 349/172 |
| 6,195,147 B1 | 2/2001 | Asao et al. | 349/133 |
| 6,310,677 B1 | 10/2001 | Togano et al. | 349/172 |
| 6,577,289 B1 | 6/2003 | Asao et al. | 345/87 |
| 6,636,193 B1 | 10/2003 | Asao et al. | 345/96 |
| 6,650,387 B1 | 11/2003 | Asao et al. | 349/133 |
| 6,710,842 B2 | 3/2004 | Munakata et al. | 349/172 |
| 6,757,045 B1 | 6/2004 | Asao et al. | 345/87 |
| 6,809,717 B2 | 10/2004 | Asao et al. | 345/102 |
| 7,145,535 B2 * | 12/2006 | Takako et al. | 345/87 |
| 2003/0128317 A1 * | 7/2003 | Ohmuro et al. | 349/113 |
| 2004/0239612 A1 | 12/2004 | Asao et al. | 349/173 |
| 2005/0243047 A1 | 11/2005 | Asao | 345/88 |
| 2005/0248714 A1 | 11/2005 | Asao | 349/179 |
| 2006/0055713 A1 | 3/2006 | Asao et al. | 345/690 |
| 2007/0080912 A1 * | 4/2007 | Asao | 345/87 |

FOREIGN PATENT DOCUMENTS

| | | | |
|---|---|---|---|
| JP | 04-052625 A | 2/1992 | 345/87 X |
| JP | 09-033915 A | 2/1997 | 345/87 X |

* cited by examiner

COLOR LIQUID CRYSTAL DISPLAY DEVICE

TECHNICAL FIELD

The present invention relates to a liquid crystal display apparatus, particularly an electrically controlled birefringence (ECB)-type liquid crystal display apparatus.

BACKGROUND ART

At present, liquid crystal displays as an example of liquid crystal display apparatuses have widely been popularized as various monitors for a personal computer and the like and as a display device for a cellular phone, and so on. In the future, the liquid crystal displays are expected to follow popularization more and more, such as development in use for big-screen television.

As a color display method for the liquid crystal displays, one called a micro-color filter method has been used widely.

The micro-color filter method effects full-color display by dividing one pixel into at least three sub-pixels and providing the three sub-pixels with color filters of three primary colors of red (R), green (G), and blue (B), respectively, thus having an advantage of readily realizing a high color-reproducing performance.

However, as a disadvantage of the micro-color filter method, a transmittance is ⅓ of a monochromatic display method, so that a light utilization efficiency is low.

This low light utilization efficiency leads to a high power consumption since it is necessary to increase a luminance of a back light or a front light when bright display is intended to be effected in a transmission-type liquid crystal display apparatus having the back light, a transflective (semi-transmission)-type liquid crystal display apparatus having the back light, or a reflection-type liquid crystal display apparatus having the front light.

The low light utilization efficiency is a more serious problem in the case of a reflection-type liquid crystal display device without using the back light. More specifically, a reflection-type color liquid crystal display device provided with the RGB color filters can ensure a sufficient viewability in extremely bright outdoors. On the other hand, however, it is difficult to ensure the sufficient viewability not only in a dark place but also in an environment of brightness in office or home.

On the other hand, as a color liquid crystal display apparatus for effecting color display without using the color filter, an ECB-type liquid crystal display apparatus, as proposed by U.S. Pat. No. 6,014,195, has been known. The ECB-type liquid crystal display apparatus is generally constituted by a pair of substrates and liquid crystal sandwiched between the substrates, and is roughly classified into those of a transmission-type and a reflection-type.

In the case of the ECB-type liquid crystal display apparatus of the transmission-type, each of the pair of substrates is provided with a polarization plate. On the other hand, in the case of the ECB-type liquid crystal display apparatus of the reflection-type, there are one-polarization plate type display apparatus in which only one of the substrates is provided with a polarization plate and two-polarization plate type display apparatus in which both of the substrates are provided with a polarization plate and a reflection plate is disposed outside each of the polarization plate.

In the case of the ECB-type liquid crystal display apparatus of the transmission-type, linearly polarized light which comes in through one of the polarization plates is changed into elliptically polarized light consisting of respective wavelength light fluxes different in state of polarization by the action of birefringence of liquid crystal layer in a process of transmitting a liquid crystal cell. The elliptically polarized light enters the other polarization plate and the transmitted light having passed through the other polarization plate is colored light consisting of light fluxes of colors corresponding to light intensities of the respective wavelength light fluxes.

In other words, the ECB-type liquid crystal display apparatus is capable of coloring light by utilizing the birefringence action of the liquid crystal layer of the liquid crystal cell and the polarization action of at least one polarization plate without using the color filter.

As described above, the ECB-type liquid crystal display device causes no light absorption by the color filter, so that it is possible to effect bright color display at a high transmittance of light.

In addition, in the ECB-type liquid crystal display apparatus, the birefringence of the liquid crystal layer is changed by an alignment state of liquid crystal molecules depending on a voltage applied between electrodes of both of the substrates of the liquid crystal cell. In correspondence thereto, the state of polarization of the respective wavelength light fluxes entering the other polarization plate is changed. For this reason, by controlling the voltage applied to the liquid crystal cell, it is possible to change the color of the colored light. As a result, it is possible to display a plurality of colors at one (the same) pixel.

In the case where the ECB-type liquid crystal display apparatus of the transmission-type is driven in a crossed-Nicol condition, it is found that the color is changed depending on an amount of retardation, i.e., birefringence. In the case where, e.g., the liquid crystal device uses a liquid crystal material having a negative dielectric anisotropy ($-\Delta\epsilon$) such that liquid crystal molecules are homeotropically (vertically) aligned to assume black under no voltage application. With an increase in voltage, the color is changed in the order of black-gray-white-yellow-red-violet-blue-yellow-violet-light blue-green.

However, in such a conventional liquid crystal display apparatus which effects display in the above described ECB mode, it is possible to effect arbitrary color display at the same pixel. However, the ECB mode is a mode utilizing coloring by retardation, so that there has arisen such a problem that a display color is changed by a change in retardation with temperature.

Further, when there is an irregularity in temperature in a panel plane, the temperature irregularity is visually identified as an irregularity in display color. It is possible to obviate the temperature irregularity by performing temperature compensation in principle. However, when fine temperature compensation is performed, it leads to an increase in total production cost of the entire display apparatus.

In the ECB mode, a viewing angle characteristic is also limited. Further, in the ECB mode, it is difficult to effect full-color display although multi-color display can be effected.

Further, in the ECB mode, it is clear from its color display principle that the display color is largely changed by a change in cell thickness. Accordingly, in such a process that a uniform cell gap is provided by using a pair of (upper and lower) substrates in combination, the ECB requires change for more strictly than other display modes. As a result, it is considered that this requirement is a large impediment to improvement in production yield.

SUMMARY OF THE INVENTION

An object of the present invention is to provide a liquid crystal display apparatus having a solved the above described problems.

A specific object of the present invention is to provide a liquid crystal display apparatus capable of effecting color display by utilizing a coloring phenomenon on the basis of an ECB effect without causing substantially no temperature dependence of hue of display color.

According to an aspect of the present invention, there is provided a liquid crystal display apparatus, comprising:

at least one polarization plate, a phase difference plate, a pair of oppositely disposed substrates at least one of which is a transparent substrate, a liquid crystal disposed between the pair of substrates, and means for applying a voltage to the liquid crystal so that a retardation of the liquid crystal is modulated depending on the voltage applied to the liquid crystal, wherein the liquid crystal is placed in a first alignment state which is determined by the pair of substrates when the voltage is not applied thereto, wherein the phase difference plate has a retardation so that light passing through the liquid crystal, the phase difference plate, and the polarization plate assumes chromatic color when the voltage is not applied to the liquid crystal, and wherein the liquid crystal is placed in a second alignment state in which the liquid crystal is aligned obliquely compared with the first alignment state so that the retardation of the liquid crystal cancels the retardation of the phase difference plate when the voltage is applied to the liquid crystal.

In a preferred embodiment of the liquid crystal display apparatus, when a voltage having a value which is not more than a predetermined value is applied to said liquid crystal, the retardation of the liquid crystal is modulated in a hue change range in which the light passing through the liquid crystal, the phase difference plate, and the polarization plate assumes chromatic color and a hue of the chromatic color is changed depending on the applied voltage and, when a voltage having a value which is not less than the predetermined value is applied to the liquid crystal, the retardation of the liquid crystal is modulated in a light brightness change range in which a brightness of the light passing through the liquid crystal, the phase difference plate, and the polarization plate is changed depending on the applied voltage, whereby achromatic color is displayed.

As another embodiment, the liquid crystal display apparatus of the present invention may be provided with a color filter through which the above described chromatic or achromatic color is displayed. More specifically, when the color of the color filter is green and the retardation of the liquid crystal has a value for displaying red or blue in the hue change range, green of spectrum colors of the light passing through the liquid crystal layer is absorbed by the color filter. As a result, the resultant color is color which is almost near the black.

In an important embodiment of the liquid crystal display apparatus of the present invention, when a color image is displayed at a plurality of pixels, one color is displayed by a combination of a first pixel at which the retardation of the liquid crystal is modulated over the hue change range wherein the hue of the chromatic color is changed depending on the applied voltage having the value which is not more than the predetermined value and the brightness change range wherein the brightness is changed depending on the applied voltage having the value which is not less than the predetermined value, and a second pixel at which a color filter is provided and the retardation of the liquid crystal is modulated in the hue change range wherein the brightness is changed depending on the applied voltage having the value which is not less than the predetermined value.

More specifically, the unit pixel is constituted by a plurality of sub-pixels including a first sub-pixel at which the retardation of the liquid crystal is modulated over the hue change range wherein the light passing through the liquid crystal, the phase difference plate, and the polarization plate assumes the chromatic color and the hue of the chromatic color is changed and a brightness change range wherein the light assumes achromatic color and a brightness of the achromatic color is changed, and a second sub-pixel at which a color filter is provided and the retardation of the liquid crystal is changed in the brightness change range wherein the brightness of the light passing through the liquid crystal, the phase difference plate, and the polarization plate is changed.

By appropriately selecting a retardation of the phase difference plate, the display color in no voltage application state is blue or bluish green. In this case, by providing a green color filter at the second sub-pixel, it is possible to effect three primary colors. Further, by providing a color filter of color complementary to green at the first sub-pixel, it is possible to enhance a purity of the display color.

In a preferred embodiment, by appropriately selecting the retardation of the phase difference plate, the display color in no voltage application state is green. In this case, by providing a red color filter at the second sub-pixel, a color reproducibility of red is good. Further, by providing a color filter of color complementary to red at a pixel (sub-pixel) capable of changing interference color by a birefringence effect, it is possible to enlarge a color space of the display color.

Incidentally, the liquid crystal display apparatus of the present invention may be used as a reflection-type liquid crystal display apparatus, a transflective-type liquid crystal display apparatus, or a transmission-type liquid crystal display apparatus.

These and other objects, features and advantages of the present invention will become more apparent upon a consideration of the following description of the preferred embodiments of the present invention taken in conjunction with the accompanying drawings.

BEST MODE FOR CARRYING OUT THE INVENTION

Hereinbelow, embodiments of the present invention will be described with reference to the drawings.

Figure 1:
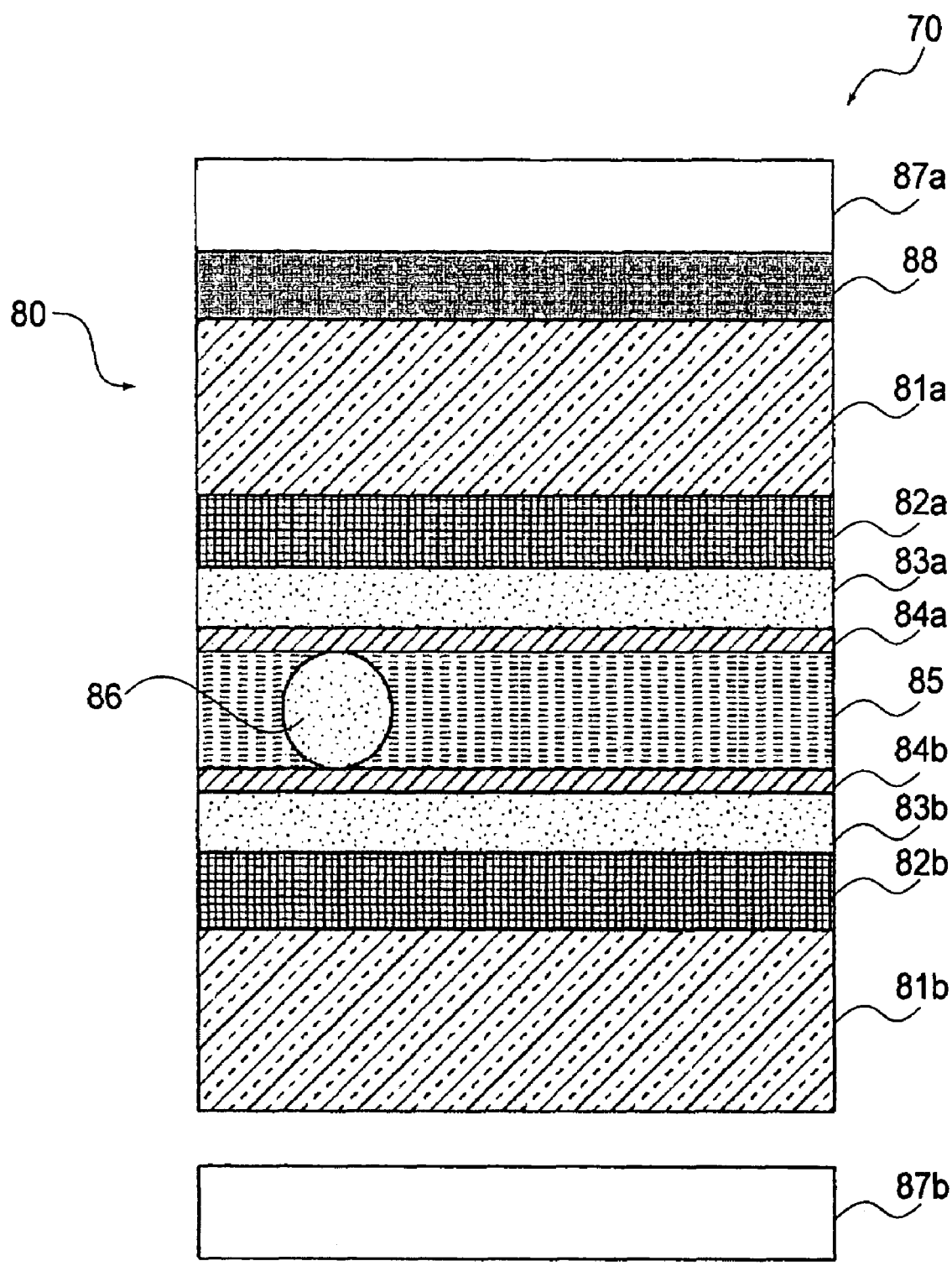
FIG. 1 is a schematic sectional view showing a structure of an embodiment of the liquid crystal display apparatus according to the present invention.

FIG. 1 is a schematic sectional view showing a structure of a liquid crystal display apparatus as an embodiment of the present invention.

Referring to FIG. 1, a liquid crystal display apparatus 70 includes a pair of polarization plates 87a and 87b having polarization axes which intersect each other at right angles, and a liquid crystal device 80 sandwiched between the pair of polarization plates 87a and 87b. The liquid crystal device 80 principally includes a pair of substrates 81a and 81b formed of a high transparent material, such as glass or plastics, and nematic liquid crystal (hereinafter, simply referred to as "liquid crystal") 85 disposed between the pair of substrates 81a and 81b.

The substrates 81a and 81b are provided with electrodes 82a and 82b, respectively, for applying a voltage to the liquid crystal (layer) 85. These electrodes 82a and 82b are stripe-like electrodes which intersect each other, thus forming a matrix electrode structure.

In the case where the reflection-type liquid crystal display apparatus is prepared, the electrode 82b may preferably be a metal electrode of aluminum, silver, or the like, having a reflection property. The metal electrode may preferably have an uneven surface shape, as a surface shape, suitable for realizing a light diffusion characteristic. In the case of the reflection-type liquid crystal display apparatus using the metal electrode, the polarization plate 87b may be omitted. Further, in the case of providing the transflective-type liquid crystal display apparatus, the apparatus is realized by forming two areas including an area constituted by the reflective metal electrode and an area constituted by the ITO electrode.

Incidentally, as the electrode structure, it is also possible to form an active matrix structure by disposing dot-like transparent electrodes each connected with TFT or MIM (metal-insulator-metal) as a switching element on one of the substrates in a matrix form and disposing an opposite electrode on the entire surface of the other substrate or in a predetermined pattern.

On these electrodes 82a and 83a, insulating films 83a and 83b having a short-circuit prevention function are formed, respectively, as desired. Further, on the insulating films 83a and 83b, alignment control films 84a and 84b are formed, respectively, so as to contact a liquid crystal 85 and function as a film for controlling an alignment state of the liquid crystal 85.

A phase difference plate 88 has a predetermined retardation. On or under the phase difference plate 88, it is also possible to use a film having a light scattering function (not shown).

Incidentally, the liquid crystal display apparatus 70 using an ordinary ECB effect-based coloring phenomenon can control the hue of display color by utilizing a change in retardation due to the change in applied voltage, and the color liquid crystal display apparatus using such a retardation change has been known.

Here, as a color displayable mode on the basis of the above described ECB principle, various alignment modes, such as a homeotropic (vertical) alignment mode, a homogeneous (parallel) alignment mode, a hybrid aligned nematic (HAN) mode, an optically compensated bend (OCB) mode, a super twisted nematic (STN) mode, and so on, may be considered. All the modes are such an alignment mode in which an amount of birefringence (hereinafter referred to as a "retardation") of the liquid crystal layer is changed by voltage application.

Figure 6:
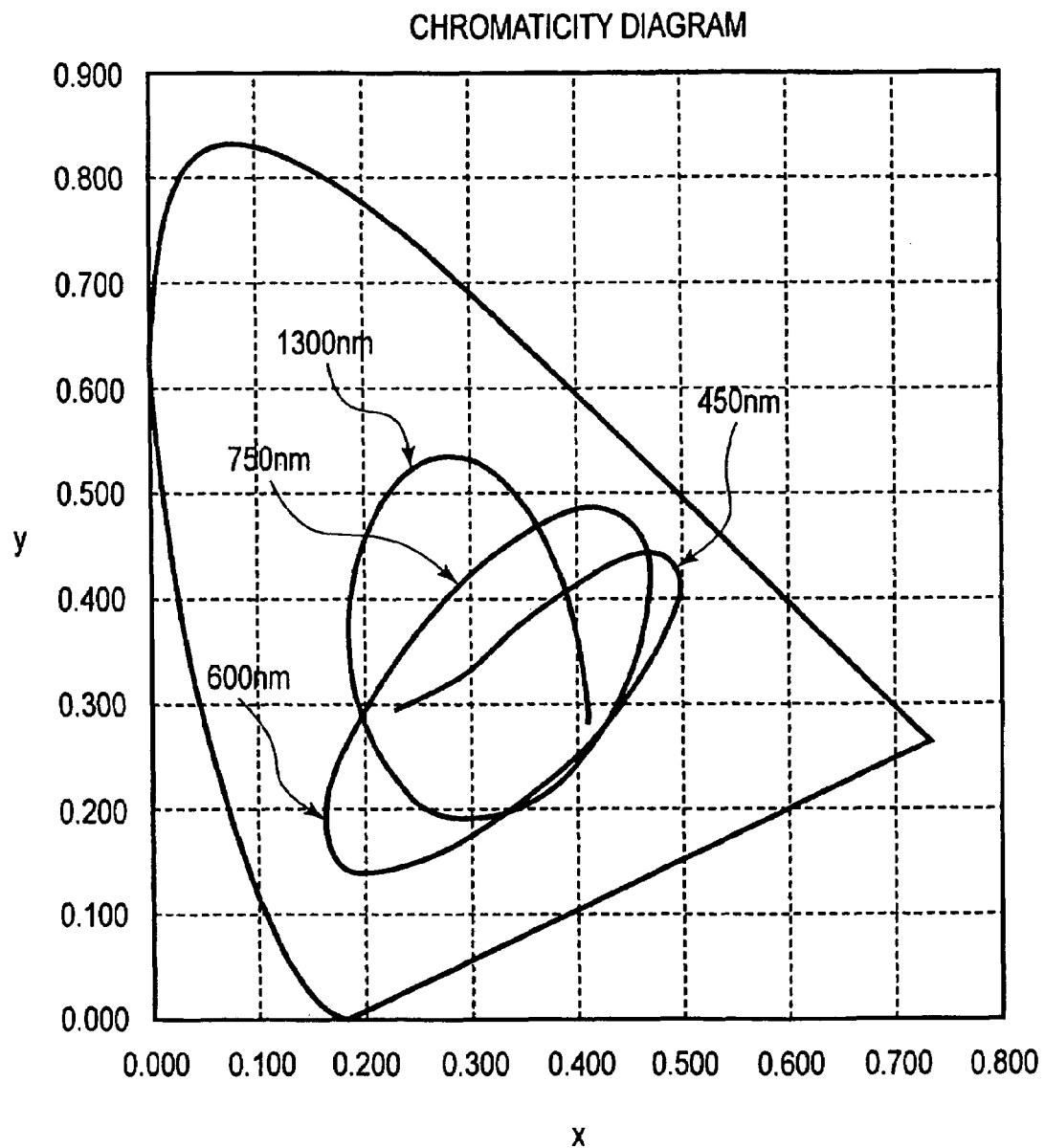
FIG. 6 is a chromaticity diagram showing a relationship between a retardation and display color in a conventional ECB liquid crystal display device.

As described above, when the retardation is changed, a spectrum of light passing through the liquid crystal layer is changed in the case where white light is incident in the liquid crystal layer, so that hue of the transmitted light is changed along the curve shown in FIG. 6.

When the homeotropic alignment mode is taken into consideration, the liquid crystal molecules are aligned perpendicular to the substrate under no voltage application, so that a retardation is substantially zero. With an increase in voltage applied to the liquid crystal layer, the liquid crystal molecules are inclined to increase the retardation. As a result, on the chromaticity diagram, the color of the transmitted light is changed in the order of black, gray, white, yellow, red, violet, blue, yellow, light blue, and green. In other liquid crystal alignment modes, the retardation at the applied voltage of zero and the manner of change thereof with respect to the applied voltage are changed variously but the change in color with respect to the retardation is similar to that in the homeotropic alignment mode.

As a result of study of the inventor on an optimum alignment mode with respect to these alignment modes, it has been clarified that the homeotropic alignment mode is optimum in order to minimize the change in display color by the change in temperature and enlarge a cell thickness margin. Hereinbelow, details thereof will be described.

In the case of the nematic liquid crystal, various physical properties thereof are changed with respect to temperature. Particularly, it has been known that the nematic liquid crystal has a large temperature dependence of a refractive index anisotropy ($\Delta n$) as a physical property parameter which effects a display characteristic. Such a change in characteristic attributable to the temperature dependence of the physical property manifests itself considerably as the change in display color by the coloring phenomenon on the basis of the above described ECB effect.

When a temperature dependence of a retardation value of a commercially available Nn-type liquid crystal material is measured, there are also some materials for which the temperature dependence of the retardation some materials for which the temperature dependence of the retardation value is not substantially observed in an intermediary voltage range between a threshold value of Freedericksz transition and a saturation voltage value. This may be attributable to realization of such a voltage range in which although the temperature dependence of $\Delta n$ is present, the temperature dependence of elastic constant affects the alignment of liquid crystal under voltage application and cancels the temperature dependence of $\Delta n$, so that the resultant temperature dependence of retardation is very small or is not substantially present.

Figure 5:
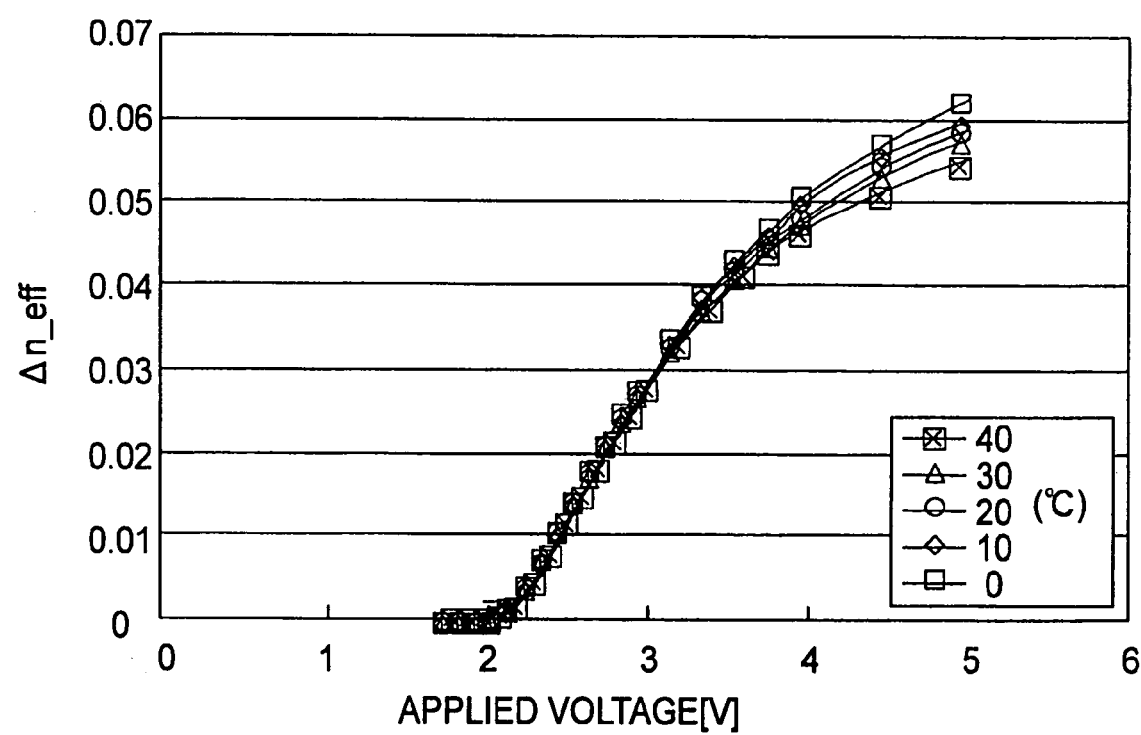
FIG. 5 is a graph showing a relationship between an applied voltage and an effective refractive index anisotropy of an ECB liquid crystal display apparatus at different temperatures.

However, even with respect to the above described liquid crystal materials, it has been confirmed experimentally that the retardation value has a large temperature dependence when a voltage close to the saturation voltage value is applied. FIG. 5 shows measurement results of retardation values. More specifically, an abscissa represents an applied voltage and an ordinate represents an effective refractive index anisotropy ($\Delta n_{eff}$) obtained by dividing retardation by cell thickness. The measurement is performed at temperatures from 0° C. to 40° C.

From the results of FIG. 5, it is found that the retardation in changed with temperature at high voltages applied to the liquid crystal material. This is presumably because almost all liquid crystal molecules of the liquid crystal layer including those in a bulk state and those located at the interfaces with the substrates are homogeneously aligned in parallel with the substrates by applying thereto a sufficiently high voltage, so that they are affected by the temperature dependence of Δn as they are to result in a very large temperature dependence of retardation.

However, up to an intermediary voltage, the temperature dependence of retardation is substantially zero or very small but at high voltages, the temperature dependence of retardation is noticeable. For this reason, with respect to the color display on the basis of ECB principle in the present invention, the color display is effected in such a voltage range that the temperature dependence of retardation is substantially zero or very small and in another voltage range, the change in retardation with temperature is large. Accordingly, another voltage range is used as such a brightness change range that the change in color is less obvious. As a result, it is possible to realize such a liquid crystal display apparatus 70 (liquid crystal device 80) that the temperature dependence during color display is not visually identified as the change in color.

In this embodiment, the liquid crystal layer in which the liquid crystal molecules are placed in such a state that they are substantially homeotropically aligned in a direction perpendicular to the substrates when no voltage is applied to the liquid crystal layer is used. In the homeotropic alignment state, however, the substrate surface is actually subjected to such a treatment that the liquid crystal molecules are obliquely aligned in the neighborhood of the substrate surface at an inclination angle of ten and several degrees from a normal to the substrate surface so as to realize an oblique alignment (state) described later. Incidentally, the homeotropic or vertical alignment (state) includes not only such an alignment (state) that a director of liquid crystal located close to the substrate surface or at a bulk portion is aligned strictly perpendicular to the substrate but also such an alignment (state) that the liquid crystal molecules are inclined at the substrate surface but the influence of the inclination is not exerted on the bulk state liquid crystal and such an alignment (state) that the influence of the inclination is exerted on the bulk state liquid crystal to incline the liquid crystal molecules at an inclination angle of several degrees to ten and several degrees. When the liquid crystal molecules at the bulk portion are inclined, the retardation is not zero but as described hereinbelow, in the present invention, a total retardation of the liquid crystal layer and the phase difference plate under no voltage application may be set so as to provide chromatic color, so that the liquid crystal molecules in the liquid crystal layer may be placed in any initial alignment state so long as the total retardation is set as described above.

By the inclination alignment treatment (pretilt treatment) in the neighborhood of the substrate surface, an axis of easy inclination of the bulk liquid crystal is aligned, so that the retardation of the liquid crystal layer at the time of no voltage application is zero. In order to effect color display at the time of no voltage application, a phase difference plate having a predetermined retardation is disposed so as to permit display of chromatic color under no voltage application. For example, the retardation of the phase difference plate is set to 300 nm and when the phase difference plate is used in a reflection-type liquid crystal display apparatus, a reciprocating phase difference of 600 nm is obtained, thus permitting display of blue.

When a liquid crystal material having a negative dielectric anisotropy is used, the liquid crystal molecules are placed in an oblique alignment state in which they are inclined with respect to the substrate when a voltage is applied thereto. As described above, by providing the alignment film with such an axiality that the easy inclination axis is directed in a desired direction when the alignment treatment of the substrate is performed, the liquid crystal molecules are inclined in the direction. In the case where the bulk liquid crystal molecules have already been inclined when the voltage is not applied thereto, the inclination becomes large in the direction by the voltage application.

Figure 7:
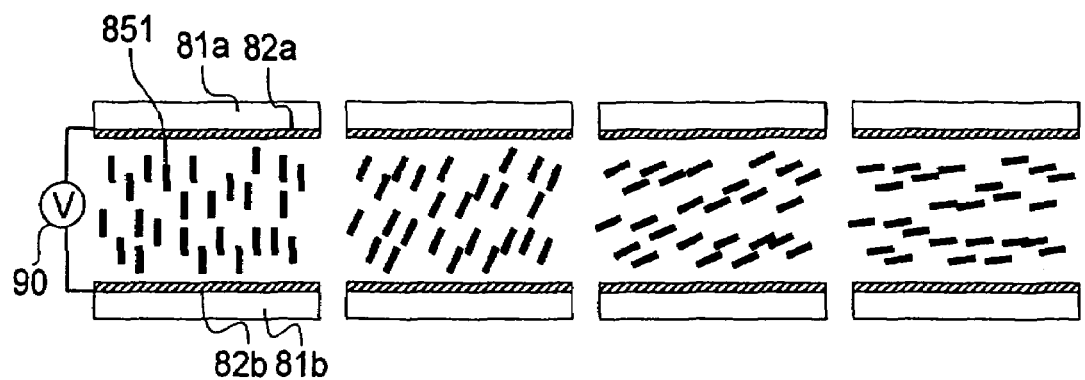
FIG. 7 is a schematic view for illustrating a change in alignment state of liquid crystal molecules in the liquid crystal display apparatus of the present invention.

The states of liquid crystal molecules which are gradually inclined when the voltage applied to the liquid crystal layer is increased is shown in FIG. 7.

As shown in FIG. 7, when an AC voltage having a larger effective value toward the rightmost view is applied from a power source 90 to electrodes 82a and 82b of substrates 81a and 81b, a liquid crystal director (a unit vector representing a direction of liquid crystal molecular long axis) 851 is gradually inclined as shown in from the leftmost view to the rightmost view. The inclination plane is a plane having the easy inclination axis.

With respect to the inclination direction of the liquid crystal molecules 851 determined by the easy inclination axis provided to the alignment film (84a in FIG. 1 and not shown in FIG. 7), the phase difference plate (88 in FIG. 1 and not shown in FIG. 7) is disposed to have a slow axis perpendicular to the inclination direction.

Figure 8:
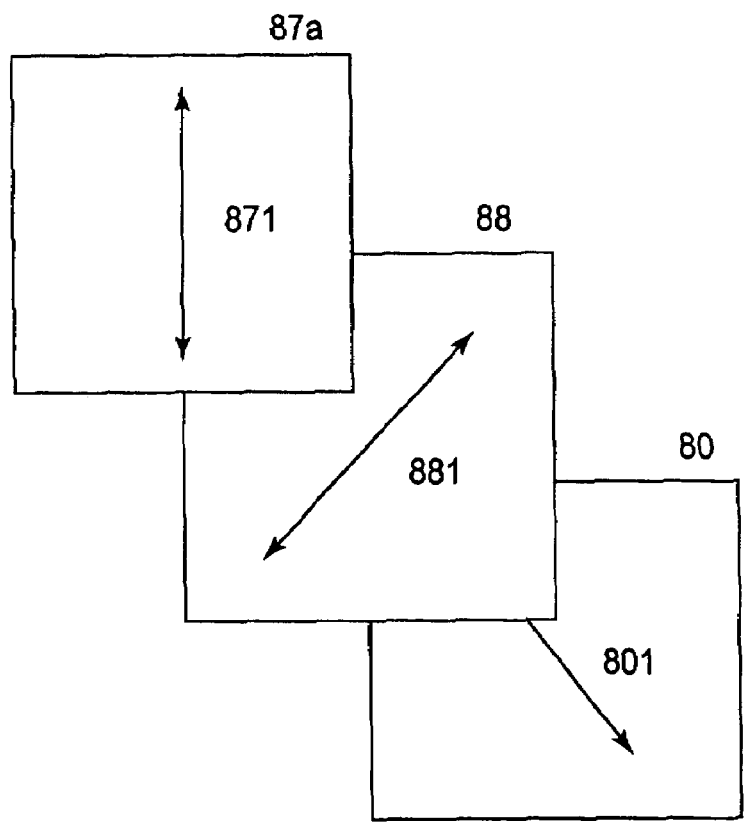
FIG. 8 is a schematic view for illustrating a constitution of the liquid crystal display apparatus of the present invention.

FIG. 8 is a view showing an angular relationship between an easy inclination axis 801 of a liquid crystal layer 80, a slow axis 881 of a phase difference plate 88, and a polarization axis 871 of a polarization plate 87a when a reflection-type liquid crystal display apparatus is viewed from a direction perpendicular to the substrate surface. In this case, the polarization plate 87a is used singly.

As shown in FIG. 8, with respect to the direction 801 of the inclination of liquid crystal molecules, the slow axis 881 of the phase difference plate is disposed perpendicularly and on the other hand, the polarization plate 87a is disposed so that the polarization plane 871 of incident light forms an angle of 45 degrees. The arrangement shown in FIG. 8 is that in the case where the liquid crystal material used has a positive refractive index anisotropy. The liquid crystal material having the positive refractive index anisotropy has a larger refractive index, in a molecular axis direction, than a refractive index in a direction perpendicular to the molecular axis direction, so that the easy inclination axis 801 is the slow axis with respect to the retardation of the liquid crystal layer 80.

In this case, by applying a voltage to the liquid crystal layer, the retardation of the liquid crystal layer cancels the retardation of the phase difference plate to reduce a total retardation of the liquid crystal layer and the phase difference plate.

Assuming that the total retardation is 700 nm and display of blue is effected under no voltage application, the retardation of the liquid crystal layer is increased with the voltage and the total retardation is decreased. As a result, the color of light passing through the liquid crystal layer, the phase difference plate, and the polarization plate in a reciprocating manner in changed from blue to red through magenta. When the total retardation is decreased to not more than 250 nm by further increasing the applied voltage, the color is removed to result in a change in brightness. In this range, it is possible to effect monochromatic display and continuously control a monochromatic gradation level by the applied voltage.

By adopting the above described device constitution, it becomes possible to realize the liquid crystal display apparatus 70 (liquid crystal device 80) which is a color displayable device no the basis of the ECB effect and has no temperature dependence of a color display characteristic.

In the present invention, the liquid crystal material is required to increase the inclination angle from the normal to the substrate with respect to the increase in voltage applied thereto. In the above described embodiments, an electric field is applied perpendicularly to the substrate by using the liquid crystal material having the negative dielectric anisotropy. However, the present invention is not necessarily limited to such a case. Even when the electric field is applied in a direction which is parallel with the substrate and along the easy inclination axis by using a liquid crystal material having a positive dielectric anisotropy, a degree of inclination of liquid crystal molecules is also increased with voltage similarly as in the above described case. Accordingly, the present invention is also applicable to such a case.

Next, a cell thickness dependence will be described.

Generally, the retardation of the liquid crystal device is represented by the following formula:

$$\Delta n_{eff}(V) \times d,$$

wherein $\Delta n_{eff}(V)$ represents a value of average refractive index in such a state that a voltage is applied to the liquid crystal layer (herein referred to as an "effective refractive index value"), and d represents a thickness of the liquid crystal layer.

Assuming that the liquid crystal device has a variation in cell thickness and an amount thereof from a center value d of the cell thickness is $\Delta d$, the retardation of the liquid crystal device can be said that it is within a range represented by the following formula:

$$\Delta n_{eff}(V) \times (d \pm \Delta d).$$

When respect to ordinary nematic liquid crystal materials, it is clear that $\Delta n_{eff}(V)$ has no cell thickness dependency, so that a degree of variation of retardation when the cell thickness varies is represented by the following formula:

$$\Delta n_{eff}(V) \times \Delta d.$$

In the conventional ECB-type color liquid crystal display apparatus, the liquid crystal layer has a large retardation value even at the time of color display. On the other hand, in the liquid crystal display device of the present invention, the effective refractive index value ($\Delta n_{eff}(V)$) of the liquid crystal layer at the time of color display is a considerably small value. In other words, even when the cell thickness varies, the resultant retardation of the liquid crystal layer (i.e., $\Delta n_{eff}(V) \times \Delta d$ has a small value, so that the change in hue during color display is remarkably suppressed compared with the case of the conventional liquid crystal display device.

Based on the above described effect, in the present invention, it becomes possible to provide a display device having a large cell thickness process margin.

Further, the liquid crystal device 80 in the present invention can be used as a color liquid crystal display device capable of displaying all the color ranges of RGB by combining a sub-pixel for displaying blue in no voltage application state through the ECB effect-based coloring phenomenon and a sub-pixel provided with a green color filter as a sub-pixel constituting each of a large number of pixels, i.e., by using the green color filter at a part of the sub-pixels constituting the pixels, as desired.

In this case, by using a color filter of a color, such as magenta, complementary to the color of the green color filter at the pixel capable of utilizing the ECB effect-based coloring phenomenon, it becomes possible to enlarge a displayable color space. Further, at other pixels, red and blue color filters are used to permit full-color display.

Alternatively, the liquid crystal device 80 in the present invention can be used as a color liquid crystal display device capable of displaying all the color ranges of RGB and having a high color reproducibility of red by combining a sub-pixel for displaying green in no voltage application state through the ECB effect-based coloring phenomenon and a sub-pixel provided with a red color filter as a sub-pixel constituting each of a large number of pixels, i.e., by using the red color filter at a part of the sub-pixels constituting the pixels.

In this case, by using a color filter of a color, such as cyan, complementary to the color of the red color filter at the pixel capable of utilizing the ECB effect-based coloring phenomenon, it becomes possible to enlarge a displayable color space. Further, at other pixels, green and blue color filters are used to permit full-color display.

Incidentally, the liquid crystal display apparatus of the present invention can be driven by any of a direct drive method, a simple matrix drive method, and an active matrix (AM) drive method. Further, the liquid crystal display apparatus may be of the transmission-type, the reflection-type, or the transflective-type. The substrate used may be glass or a flexible material such as plastics. In the case of the reflection-type liquid crystal display apparatus, as a reflection plate, it is possible to use those of various types such as a so-called front scattering type in which a mirror reflection plate is used as the reflection plate and a scattering plate is outside a liquid crystal layer, and a direction diffusion reflection plate having a directive reflection surface by appropriately designing the shape of the reflection surface.

As the liquid crystal material, the nematic liquid crystal material having a negative dielectric anisotropy is used, and on the basis of the presence of such a voltage range that a change rate of a retardation R to a temperature ($\Delta R/\Delta T$) is substantially zero under such an applied voltage condition that the applied voltage is not less than a threshold value of Freedericksz transition, the coloring phenomenon utilizing the ECB effect in this voltage range is used. As a result, a bright display device which has minimized the change in display color with the change in temperature is obtained, so that the display device has a large cell thickness process margin to expect an improvement in yield. Further, it is possible to provide a change having a wide viewing angle.

Hereinbelow, the present invention will be described based on Examples.

In the following examples, a common device structure described below is used.

As a structure of a liquid crystal layer, two glass substrates subjected to homeotropic (vertical) alignment treatment are applied to each other with a gap therebetween to prepare a cell. In the gap of the cell, a liquid crystal material ("MLC-6608", mfd. by Merk & Co., Inc.) having a negative dielectric anisotropy ($\Delta \epsilon < 0$) is injected by a capillary action. At this time, a cell thickness is changed, depending on the examples, so as to appropriately set a retardation value.

As a substrate structure used, (1) a single bit test cell for measuring the retardation value, and (2) an active matrix (AM) cell for evaluating a display characteristic are used.

The single bit test cell is prepared by applying two substrates each provided with a patterned electrode of ITO (indium-tin-oxide) having a 1 cm-square area. The AM cell include an AM substrate provided with TFTs (thin film transistors) and an ITO-formed substrate which is provided with or not provided with a color filter depending on the examples. Further, depending on the examples, a pixel shape and a color filter constitution are changed.

As a pixel electrode on the TFT-provided AM substrate, or aluminum electrode is used to provide a reflection-type constitution, and a front scattering plate (mfd. by Polatechno Co., Ltd.) is disposed at an outermost surface of the AM substrate to enlarge a viewing angle. Further, in each of the single bit test cell and the AM cell, an alignment film ("JALS 2021", mfd. by JSR Corp.) is formed in a thickness of 50 nm, and the substrate provided therewith is subjected to rubbing to provide a pretilt angle of about 1 degree from a direction of a normal to the substrate.

(Measurement of Retardation)

By using the single bit test cell, a temperature dependence of retardation is measured. More specifically, a polarizing microscope is used for measuring the retardation under a cross-nicol condition in combination with a Bereck-type compensator (mfd. by Olympus Optical Co., Ltd.). Measurement of the retardation is performed with respect to four types of cells having different cell thicknesses of (a) 4.0 μm, (b) 5.0 μm, (c) 6.0 μm and (d) 7.0 μm.

As a result, with respect to all the cells, it is confirmed that the temperature dependence is not observed in a voltage range of not more than 3.2 V. On the other hand, through observation of optical response, with respect to all the cells, a threshold voltage of Freedericksz transition is about 2.1 V.

In other words, by the above measurement, it is confirmed that there is a voltage range in which a change rate ($\Delta R/\Delta T$) of retardation R to temperature T of the liquid crystal material (MLC-6608) having $\Delta\epsilon<0$ is substantially zero under a condition of an applied voltage of not less than the threshold voltage of Freedericksz transition and that a maximum voltage value in the voltage range is about 3.2 V.

COMPARATIVE EXAMPLE 1

An AM cell, having a diagonal size (length) of 12 inches and SVGA (800×600×3) pixels, for evaluating a display characteristic is prepared. The AM is not provided with a color filter and includes a wide-band λ/4 plate (phase-compensation plate capable of substantially satisfying ¼ wavelength condition in visible light region) disposed between the upper substrate (not provided with the TFTs) and the polarization plate, thus providing such a normally black constitution that a dark state is given at the time of no voltage application and a bright state is given at the time of voltage application. In this case, four types of cells having different cell thicknesses of (a) 4.0 μm, (b) 5.0 μm, (c) 6.0 μm, and (d) 5.0 μm are used.

By using these cells, a temperature dependence of chromaticity is measured by a measuring apparatus ("BM 7", mfd. by TOPCON Corp.) under conditions including a drive voltage of up to 5 V under a constraint of driver IC and a temperature of 10-30° C. under a constraint of measuring environment.

As a result, it is confirmed that the temperature dependence at a changed displayed under application of a drive voltage of not more than 3.2 V is not observed with respect to all the cells.

In the cell having the cell thickness (a), red display is effected at an applied voltage of 5 V but it is visually identified that a change in display color is caused to occur at an applied voltage of 5 V due to the difference in environmental temperature.

In the cell having the cell thickness (b), blue display is effected at 5 V and red display is effected at 3.9 V. However, with respect to both of the display colors of blue and red, it is visually identified that a change in display color is caused to occur due to the difference in environmental temperature.

In the cell having the cell thickness (c), blue display is effected at 4 V and red display is effected at 3.5 V. However, with respect to both of the display colors of blue and red, it is visually identified that a change in display color is caused to occur due to the difference in environmental temperature although a degree of the change is somewhat reduced compared with the case of the cell thickness (b).

In the cell having the cell thickness (d), blue display is effected at 3.6 V and used display is effected at 3.2 V. As a result, on a chromaticity diagram, different values for blue are obtained due to the difference in environmental temperature during the blue display but the difference is not visually identified. Accordingly, the change in display color due to the difference in environmental temperature is not visually identified with respect to both of the display colors of blue and red.

As described above, according to this comparative example, it is found that the temperature dependence is of no problem for the cell thickness of not less than 7 μm but it is difficult to obtain a good characteristic as a color display apparatus with respect to the cell thicknesses of less than 7 μm since the temperature dependence is confirmed as the change in display color when the cell has the cell thickness of less than 7 μm.

EXAMPLE 1

Four types of cells are prepared in the same manner as in Comparative Example 1 except that in addition to the wide-band λ/4 plate, a uniaxial phase difference plate having a retardation value of about 320 nm is disposed in lamination so that when a polarization axis of the polarization plate is taken as 0 degrees, an optical axis of the uniaxial phase difference plate is located at a position forming an angle of 45 degrees from the polarization axis in a clockwise direction and an inclination direction of liquid crystal molecules under voltage application forms an angle of 45 degrees from the polarization axis in a counterclockwise direction (i.e., the direction of −45 degrees). As a result, the resultant cells have such a normally blue constitution that a blue display state is given at the time of no voltage application and a change in hue is caused to occur at the time of voltage application.

When the four types of the cells are subjected to measurement of a temperature dependence of chromaticity, the following results are obtained.

In the cell having the cell thickness (a), blue display is effected under no voltage application and red display is effected at 2.8 V. These display colors cause no change thereof, thus being stable. In this cell, a white display state providing a maximum reflectance is obtained at 3.75 V but more than half of light for white display is reflected even under application of a voltage of 5 V. This is because the cell thickness is excessively small, so that the retardation of liquid crystal layer fails to cancel the retardation of phase difference plate even when the retardation of liquid crystal layer is a maximum value. When a 5 V application state is used as a black state, a resultant contrast is not more than 2, thus failing to provide a good display state.

In the cell having the cell thickness (a), blue display is effected under no voltage application and red display is effected at 2.65 V. These display colors cause no change thereof, thus being stable. In this cell, a white display state providing a maximum reflectance is obtained at 3.3 V, and a black display state is obtained at 5 V. This is because the retardation of liquid crystal layer substantially cancels the retardation of phase difference plate to result in a total retardation of zero, i.e., the black display state. As this time, the liquid crystal molecules are aligned in a maximum inclination state, so that the retardation of liquid crystal layer is changed with the temperature change as described above but only a luminance level of black is changed. As a result, a change in hue is not caused to occur, so that abnormal color is not caused to occur in the display image. Further, a variation in black level is not noticeable due to a low luminance, thus being practically of no problem.

In the cell having the cell thickness (a), blue display is effected under no voltage application and red display is effected at 2.55 V. These display colors cause no change thereof, thus being stable. In this cell, a white display state providing a maximum reflectance is obtained at 3.1 V, and a black display state is obtained at 4.25 V. The black level is slightly fluctuated by changing the temperature but is at an unobservable level through eye observation.

In the cell having the cell thickness (a), blue display is effected under no voltage application and red display is effected at 2.5 V. These display colors cause no change thereof, thus being stable. In this cell, a white display state providing a maximum reflectance is obtained at 2.95 V, and a black display state is obtained at 4.25 V.

According to this example, it is possible to obtain such a characteristic that the temperature dependence is practically of no problem in the cell thickness of not less than 5 µm. IN other words, compared with Comparative Example 1, it becomes possible to set a thinner cell thickness.

EXAMPLE 2

Four types of cells are prepared in the same manner as in Comparative Example 1 except that the uniaxial phase difference plate having a retardation value of about 320 nm is changed to a three-layer lamination film including two NH films (mfd. by NIPPON OIL EXPLORATION Ltd.) having an in-plane retardation of 110 nm and one NH film having an in-plane retardation of 100 nm. When a polarization axis of the polarization plate is taken as 0 degrees, an optical axis of the NH films is located at a position forming an angle of 45 degrees from the polarization axis in a clockwise direction and an inclination direction of liquid crystal molecules under voltage application forms an angle of 45 degrees from the polarization axis in a counterclockwise direction (i.e., the direction of −45 degrees). Incidentally, NH films are a phase difference plate in which polymeric liquid crystal molecules are inclination-aligned, and are used for the purpose of enlarging a viewing angle of twisted nematic (TN) liquid crystal by utilizing a biaxial anisotropy of refractive index.

When the four types of the cells are subjected to measurement of a temperature dependence of chromaticity, similarly as in Example 1, it is possible to obtain such a characteristic that the temperature dependence is practically of no problem in the cell thickness of not less than 5 µm. IN other words, compared with Comparative Example 1, it becomes possible to set a thinner cell thickness.

When a viewing angle dependency is measured, a better result than that by the constitution of Example 1 is obtained.

Accordingly, it is confirmed that the NH film is effective in enlarging the viewing angle when it is used in not only TN-mode liquid crystal display apparatus but also the liquid crystal display apparatus according to the present invention. Further, according to this example, an effectiveness of use of the biaxial phase difference plate is confirmed.

EXAMPLE 3

A similar experiment to Example 2 was performed. In this example, however, a WV film (mfd. by Shumitomo Chemical Co., Ltd.) is disposed between the polarization plate and the NH lamination film in addition to the same constitution as Example 2. The WV film is a phase difference plate in which a discotic liquid crystal having a negative phase difference is inclination aligned, and are used for the purpose of enlarging the viewing angle of the TN liquid crystal.

When the WV film is disposed so that the inclination alignment direction thereof is perpendicular to that of the NH lamination film, such a good result that the viewing angle characteristic is well balanced is attained. On the other hand, when these inclination alignment directions are aligned with each other, the viewing angle characteristic is somewhat poor in the direction of −45 degrees but is improved in the direction of 45 degrees.

In other words, by lamination of the WV film, it is possible to confirm the improvement effect of the viewing angle characteristic with respect to not only the TN liquid crystal but also the liquid crystal mode in the present invention. Further, it becomes possible to provide an optimum viewing angle characteristic by appropriately adjusting the direction of optical axis at the time of the lamination.

EXAMPLE 4

A similar experiment of Example 1 is performed. In this example, however, an Sz film (mfd. by Sumitomo Chemical Co., Ltd.) is used instead of the uniaxial phase difference plate in Example 1. The Sz film is a polymeric film, used for the purpose of improving a viewing angle characteristic of an STN liquid crystal, having an index ellipsoid satisfying: nx>ny>nz wherein nx represents a refractive index of the phase difference plate in a film optical axis direction, ny represents a refractive index in a direction perpendicular to the direction of nx in the plane of the phase difference plate, and nz represents a refractive index in a direction of a normal to the phase difference plate.

The experiment is performed by using such an Sz film that it has nx−ny value of 320 nm and (nx−nz)/(nx−ny) value of 0.5.

Four types of liquid crystal cells having different cell thicknesses as described above are subjected to measurement of the temperature dependence of chromaticity in the same manner as in Example 1. As a result, similarly as in Example 1, it is possible to obtain the temperature dependence of practically no problem at the cell thickness of not less than 5 µm. Accordingly, according to this example, it becomes possible to set a thinner cell thickness than Comparative Example 1.

When the viewing angle dependency is measured, the result in this example is better than that in Example 1. As a result, it is possible to confirm that the Sz film can achieve the viewing angle enlarge effect not only in the STN mode but also in the case where the liquid crystal display apparatus of the present invention is used. Further, it is also possible to confirm the effectiveness of the biaxial phase difference plate used in the liquid crystal display apparatus of the present invention.

EXAMPLE 5

An AM cell (display device) is prepared by arranging the liquid crystal display devices having the cell thickness (b) 5.0 μm described in Examples 1-4 in a matrix of 800×600 (SVGA) mode.

Figure 2:
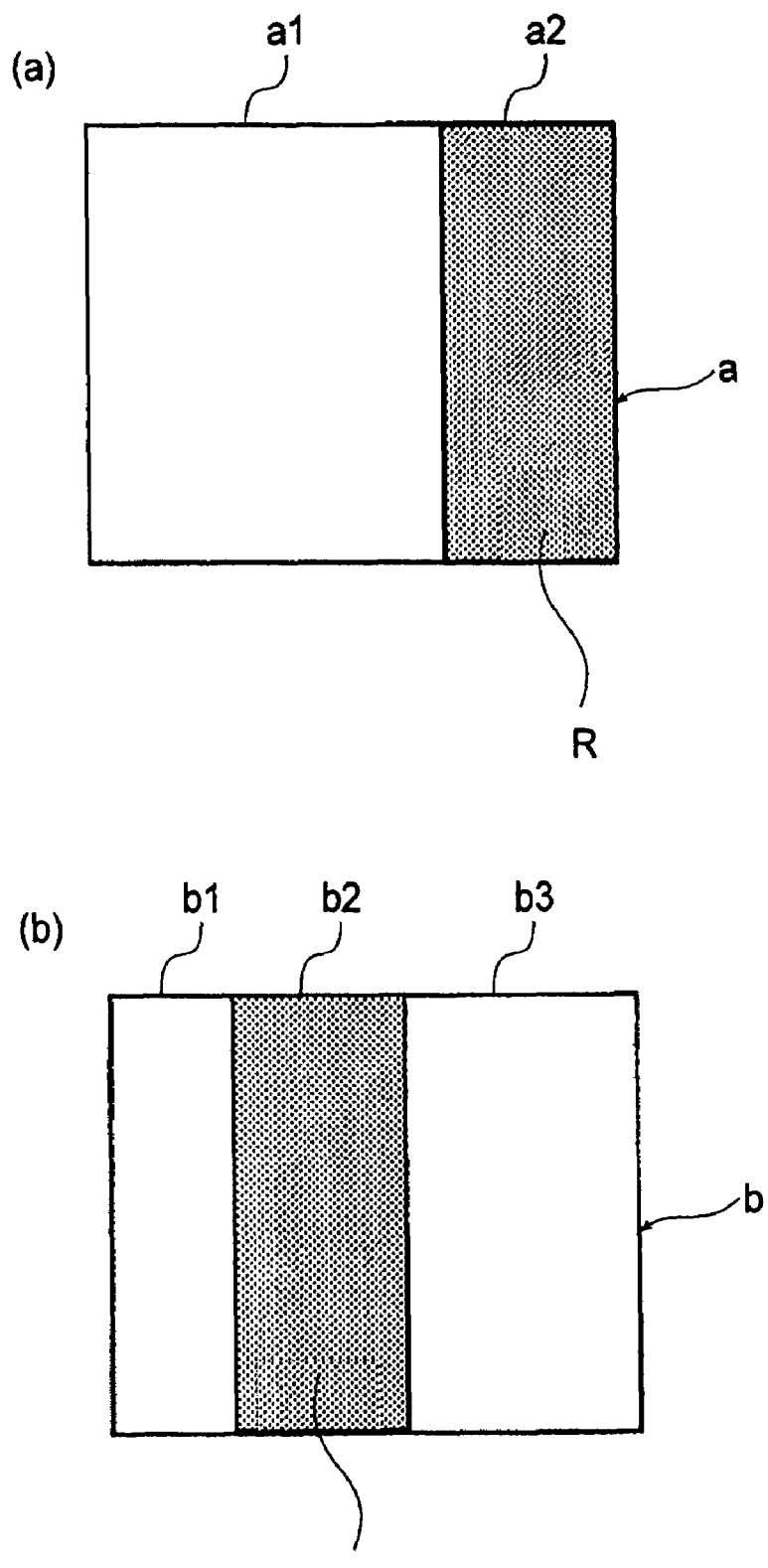
FIGS. 2(a), 2(b), 3 and 4 are schematic views each showing a pixel constitution used in Example of the present invention.

Each pixel is divided into two sub-pixels a1 provided with no color filter and a2 provided with a green color filter as shown in FIG. 2(a).

When a voltage is not applied to the liquid crystal layer, blue display is effected at the sub-pixel a1 provided with no color filter and a2 provided with a green color filter as shown in FIG. 2(a).

When a voltage is not applied to the liquid crystal layer, blue display is effected at the sub-pixel a1 provided with no color filter and substantially black display is effected at the sub-pixel a2 provided with the color filter. When the voltage is applied to the liquid crystal layer, the display color at the sub-pixel a1 is changed from blue to red at 2.6 V through violet and the display color at the sub-pixel a2 remains substantially black as it is. When the applied voltage is further increased, the display color at the sub-pixel a1 is changed from yellow to white at 3.3 V. Thereafter, a brightness of white is gradually lowered while assuming achromatic color as it is to provide gray, thus finally providing black at about 5 V. At the sub-pixel a2, the color (green) of the green color filter is visible at about 3.3 V and a brightness of green is gradually lowered, while assuming green, with an increasing voltage, thus finally providing also black at 5 V.

As described above, at the sub-pixel a1, the hue of the chromatic color is changed in a low voltage range from 0 V to 3.3 V and the brightness of the achromatic color is changed in high voltage range from 3.3 V to 5 V, so that the voltage modulation is effected over both of these low and high voltage ranges, it is possible to effect display of both the chromatic colors of blue, red and colors having their intermediary hues and the achromatic colors of halftones of the achromatic colors from white to black. On the other hand, at the sub-pixel a2 provided with the green color filter, it is possible to effect continuous gradation display of green in the voltage range from 3.3 V to 5 V.

According to this example, it is possible to display all the three primary colors (RGB), so that a color display can be effected by driving the AM cell in the low and high voltage ranges with a threshold voltage for displaying white (3.3 V in this example) at the sub-pixel a1 and in the high voltage range at the sub-pixel a2 and by using the resultant colors in combination. It is also possible to partially display halftones.

Further, the resultant hue can be expected that it is not changed with temperature.

EXAMPLE 6

An AM cell is prepared in the same manner as in Example 5 except that the sub-pixel provided with no color filter is further divided into two portions, which are provided with a magenta color filter. More specifically, as shown in FIG. 2(b), each pixel b is divided into three sub-pixels including a sub-pixel b2 provided with a green color filter, and sub-pixels b1 and b3 which are provided with the magenta color filter and have an areal ratio of 1:2. By driving the AM cell at these sub-pixels independently, it is possible to effect halftone display of an arbitrary chromatic color from blue to red at four gradation levels. Further, by the color filters, color purities of the display colors of blue and red are increased.

According to this example, similarly as in Example 5, it is possible to confirm that all the RGC primary colors are displayable and that a color reproducibility is improved compared with Example 5. Further, it is also similarly possible to except that the hue is not changed with temperature.

EXAMPLE 7

Figure 3:
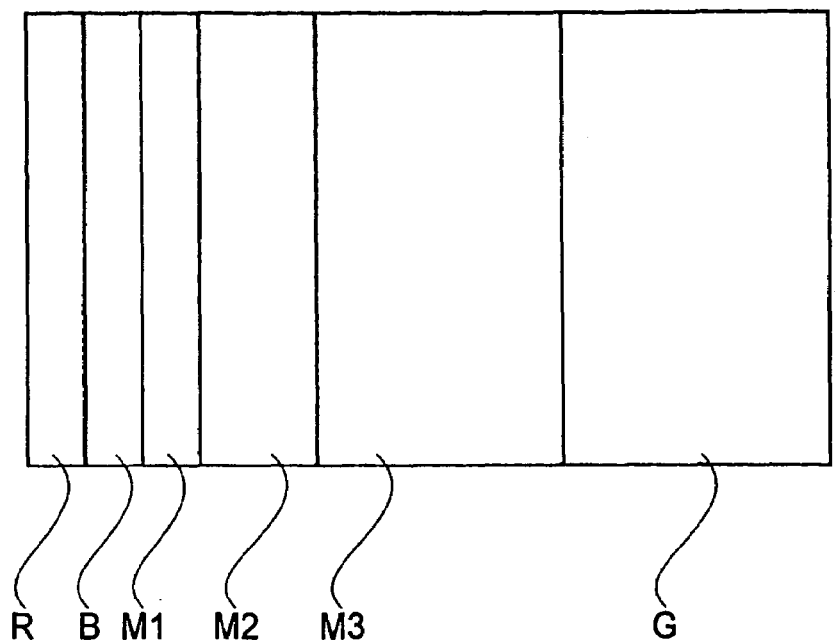

An AM cell is prepared by using the liquid crystal display devices having the cell thickness (b) 5.0 μm described in Examples 1-4 with pixels each divided into six sub-pixels as shown in FIG. 3. More specifically, each pixel is divided into six sub-pixels R, G B, M1, M2 and M3, provided with color filters of red, green, blue, magenta, magenta, and magenta, respectively. The sub-pixel G has an areal which is ⅓ of the area of each pixel. In the remaining area (⅔ of the area of each pixel), the five sub-pixels R, B, M1, M2 and M3 are disposed at an areal ratio of 1:1:1:2:4.

As a result, it is possible to confirm that all the RGB primary colors are displayable and that the color reproducibility is increased compared with Example 5. Further, it is also possible to confirm that the hue is not changed with temperature. In addition, it is possible to confirm that complete full-color display can be effected.

EXAMPLE 8

Four types of AM cells are prepared in the same manner as in Comparative Example 1 except that the wide-band λ/4 plate is changed to a uniaxial phase difference plate having a retardation value of about 400 nm so that when a polarization axis of the polarization plate is taken as 0 degrees, an optical axis of the uniaxial phase difference plate is located at a position forming an angle of 45 degrees from the polarization axis in a clockwise direction and an inclination direction of liquid crystal molecules under voltage application forms an angle of 45 degrees from the polarization axis in a counterclockwise direction (i.e., the direction of −45 degrees). As a result, the resultant cells have such a normally blue constitution that a green display state is given at the time of no voltage application although a color purity is not so high and that a change in hue is caused to occur at the time of voltage application.

When the four types of the cells are subjected to measurement of a temperature dependence of chromaticity, the following results are obtained.

In the cell having the cell thickness (a), green display is effected under no voltage application, blue display is effected at 2.85 V, and used display is effected at 3.5 V. With respect to these display colors, green and blue are not changed due to the change in environmental temperature but red is changed due to the change in environmental temperature. Further, at 5 V, a white display state providing a maximum reflectance is obtained but a black display state cannot be obtained.

In the cell having the cell thickness (b), green display is effected under no voltage application, blue display is effected at 2.7 V, and used display is effected at 3.15 V. With respect to these display colors, all the display colors (three primary colors) are not changed due to the change in environmental temperature, thus being stable against temperature. Further, at 4.2 V, a white display state providing a maximum reflectance is obtained but a reflectance is approximately ¾ of a reflectance at the time of white display even when a voltage of 5 V is applied, thus failing to provide a white/black contrast.

In the cell having the cell thickness (c), green display is effected under no voltage application, blue display is effected at 2.6 V, and used display is effected at 2.95 V. With respect to these display colors, all the display colors (three primary colors) are not changed due to the change in environmental temperature, thus being stable against temperature. Further, at 3.65 V, a white display state providing a maximum reflectance is obtained and a 5 V, a black display state is obtained. However, a resultant contrast is low, i.e., about 6, thus failing to obtain a complete black level. Incidentally, the black level is somewhat changed by changing the temperature but is a level of practically no serious problem. As a result, it is possible to effect stable display of the three primary colors and stable white/black display with respect to the temperature.

In the cell having the cell thickness (d), green display is effected under no voltage application, blue display is effected at 2.55 V, and used display is effected at 2.8 V. With respect to these display colors, all the display colors (three primary colors) are not changed due to the change in environmental temperature, thus being stable against temperature. Further, at 3.35 V, a white display state providing a maximum reflectance is obtained and a 4.55 V, a black display state is obtained. Further, a resultant contrast is about 30, thus being a practically sufficient level. Incidentally, the black level is slightly changed by changing the temperature but is an unrecognizable level through eye observation.

According to this example, with respect to the cell thickness of not less than 7.0 µm, the three primary colors are displayable and such a display characteristic that a contrast ratio so high. Further, it becomes possible to provide the temperature dependence of practically no problem.

EXAMPLE 9

In this example, with respect to such a constitution as in Example 8 that green display is effected under no voltage application, the biaxial phase difference plates (films) similar to those used in Examples 2 to 4 are evaluated. As a result, also with respect to the normally green constitution, the viewing angle improvement effect is attained by the biaxial phase difference plates, so that it is possible to confirm the effectiveness of the biaxial phase difference plates.

EXAMPLE 10

Figure 4:
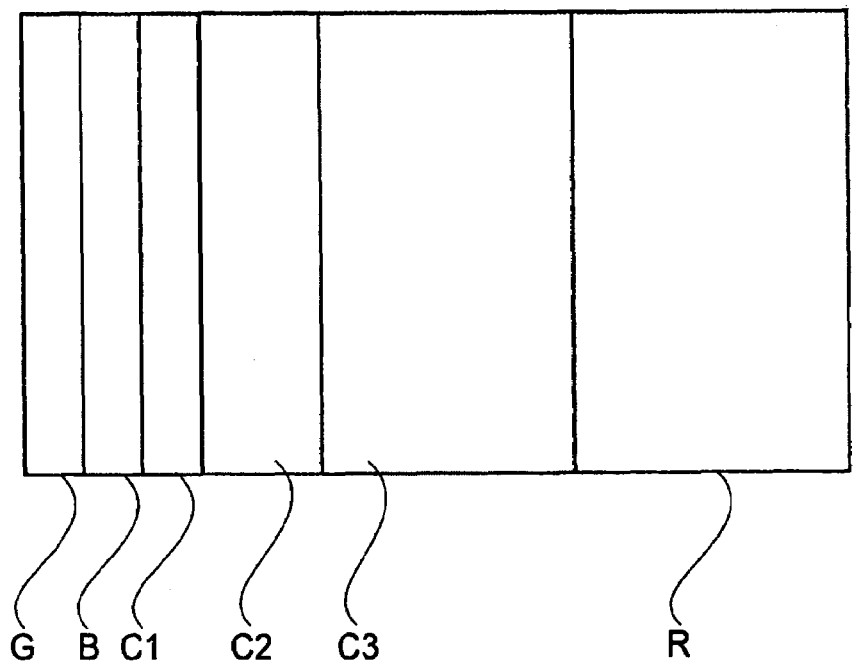

An AM cell having a cell thickness of 7.0 µm is prepared in the same manner as in Example 8 except that the pixel constitution is changed to that shown in FIG. 4. More specifically, one pixel is divided into six sub-pixels R, G, B, C1, C2 and C3 provided with color filters of red, green, blue, cyan, cyan and cyan, respectively. The sub-pixel R provided with the red color filter has an area which is 1/3 of the area of each pixel. IN the remaining area (2/3 of the area of each pixel), the five sub-pixels G, B, C1, C2 and C3 have an areal ratio of 1:1:1:2:4.

As a result, it is possible to confirm that all the RGB primary colors are displayable and that the color reproducibility is increased compared with Example 8. Further, it is also possible to confirm that the hue is not changed with temperature. In addition, it is possible to confirm that complete full-color display can be effected.

EXAMPLE 11

In this example, an irregularity in display color when a uniformity in cell thickness is not obtained in a cell preparation process is evaluated with respect to the cells prepared in Examples 1 to 10. As a result, it is possible to confirm that degrees of the display color irregularity with respect to all the cells in Examples 1 to 10 are smaller than that in the case of Comparative Example 1.

INDUSTRIAL APPLICABILITY

As described hereinabove, according to the present invention, it is possible to realize a color liquid crystal display apparatus which utilizes such an ECB effect-based coloring phenomenon that the temperature dependence of hue is not visually identified.

In the above description, the reflection-type liquid crystal display apparatus is principally described. However, the present invention is not limited thereto but is also applicable to a transmission-type liquid crystal display apparatus and a transflective-type liquid crystal display apparatus. Further, in the present invention, as the drive substrate, the TFT substrate is used but may be replaced with a substrate provided with MIM (metal-insulator-metal). Further, it is also possible to employ a drive method in which the cell has a simple matrix structure.

The invention claimed is:

1. A liquid crystal display apparatus, comprising:
   a polarization plate,
   a phase difference plate,
   a pair of oppositely disposed substrates at least one of which is a transparent substrate and the other is a reflective substrate,
   a liquid crystal disposed between said pair of substrates, said liquid crystal being aligned homeotropically with respect to the pair of substrates when no voltage is applied to the liquid crystal, and
   means for applying a voltage to said liquid crystal so that said liquid crystal is aligned obliquely with respect to the pair of substrates with an angle depending on the voltage applied to said liquid crystal,
   wherein said phase difference plate has a retardation so that light passing through said liquid crystal, said phase difference plate, and said polarization plate assumes chromatic color when the voltage is not applied to said liquid crystal, and
   wherein the retardation of said liquid crystal cancels the retardation of said phase difference plate when the voltage is applied to said liquid crystal.

2. An apparatus according to claim 1, wherein, when a voltage having a value which is not more than a predetermined value is applied to said liquid crystal, the retardation of said liquid crystal is modulated in a hue change range in which the light passing through said liquid crystal, said phase difference plate, and said polarization plate assumes chromatic color and a hue of the chromatic color is changed depending on the applied voltage and, when a voltage having a value which is not less than the predetermined value is applied to said liquid crystal, the retardation of said liquid crystal is modulated in a light brightness change range in which a brightness of the light passing through said liquid crystal, said phase difference plate, and said polarization plate is changed depending on the applied voltage.

3. An apparatus according to claim 2, wherein the voltage having the predetermined value is a voltage for effecting white display.

4. An apparatus according to claim 2, wherein said apparatus effects black display when a maximum voltage which is not less than the voltage having a predetermined value is applied.

5. An apparatus according to claim 2, wherein said apparatus has a first area in which the retardation of said liquid crystal is modulated over the hue change range wherein the hue of the chromatic color is changed depending on the applied voltage having the value which is not more than the predetermined value and the brightness change range wherein the brightness is changed depending on the applied voltage having the value which is not less than the predetermined value, and a second area in which a color filter is provided and the retardation of said liquid crystal is modulated in the hue change range wherein the brightness is changed depending on the applied voltage having the value which is not less than the predetermined value.

6. An apparatus according to claim 1, wherein the unit pixel is constituted by a plurality of sub-pixels including a first sub-pixel at which the retardation of said liquid crystal is modulated over the hue change range wherein the light passing through said liquid crystal, said phase difference plate, and said polarization plate assumes the chromatic color and the hue of the chromatic color is changed and a brightness change range wherein the light assumes achromatic color and a brightness of the achromatic color is changed, and a second sub-pixel at which a color filter is provided and the retardation of said liquid crystal is changed in the brightness change range wherein the brightness of the light passing through said liquid crystal, said phase difference plate, and said polarization plate is changed.

7. An apparatus according to claim 6, wherein the chromatic color at the first sub-pixel when the voltage is not applied to said liquid crystal is blue or bluish green.

8. An apparatus according to claim 7, wherein the color filter provided at the second sub-pixel is a green color filter.

9. An apparatus according to claim 8, wherein at the first sub-pixel, a color filter of color complementary to green is provided.

10. An apparatus according to claim 6, wherein the chromatic color at the first sub-pixel when the voltage is not applied to said liquid crystal is green.

11. An apparatus according to claim 10, wherein the color filter provided at the second sub-pixel is a red color filter.

12. An apparatus according to claim 11, wherein at the first sub-pixel, a color filter of color complementary to red is provided.

13. An apparatus according to claim 1, wherein said liquid crystal has a voltage range in which a change ratio of the retardation to a temperature is substantially zero.

14. An apparatus according to claim 1, wherein said phase difference plate has a biaxial refractive index.

15. An apparatus according to claim 14, wherein said phase difference plate has refractive indices nx, ny and nz satisfying:

$$nx>nz>ny,$$

wherein nx represents a refractive index of said phase difference plate in an optical axis direction, ny represents a refractive index in a direction perpendicular to the optical axis in a plane of said phase difference plate, and nz represents a refractive index in a thickness direction of said phase difference plate.

* * * * *

UNITED STATES PATENT AND TRADEMARK OFFICE
CERTIFICATE OF CORRECTION

PATENT NO.        : 7,365,813 B2
APPLICATION NO.   : 10/553035
DATED             : April 29, 2008
INVENTOR(S)       : Yasufumi Asao It is certified that error appears in the above-identified patent and that said Letters Patent is hereby corrected as shown below:

COLUMN 3:
Line 4, "having a" should read --having--.

COLUMN 6:
Line 39, "manifects" should read --manifests--.

COLUMN 8:
Line 65, "in" should read --is--.

COLUMN 9:
Line 40, "When" should read --With--.

COLUMN 13:
Line 34, "IN" should read --In--.
Line 63, "IN" should read --In--.

COLUMN 15:
Line 11, "al" should read --a1--.
Line 15, "al" should read --a1--.
Line 19, "al" should read --a1--.
Line 22, "al" should read --a1--.

COLUMN 17:
Line 58, "IN" should read --In--.

Signed and Sealed this

Second Day of December, 2008

JON W. DUDAS
*Director of the United States Patent and Trademark Office*